United States Patent Office 3,849,472
Patented Nov. 19, 1974

3,849,472
PROCESS FOR PREPARING 3-PENTENENITRILE
Dhafir Yusuf Waddan, Stockton-on-Tees, England, assignor to Imperial Chemical Industries Limited, London, England
No Drawing. Filed July 9, 1973, Ser. No. 377,183
Claims priority, application Great Britain, July 31, 1972, 35,639/72
Int. Cl. C07c *121/04*
U.S. Cl. 260—465.3                     6 Claims

ABSTRACT OF THE DISCLOSURE

The reaction of olefins with hydrogen cyanide to give organic nitriles, for example of butadiene to give 3-pentene nitrile, is affected in good yield in presence of only catalytic amounts of a Group IB metal salt where the salt is used in the form of a complex with an organic nitrile.

---

This invention relates to the manufacture organic nitriles and more particularly to their manufacture by reaction of olefinic compounds with hydrogen cyanide in the presence of a catalyst.

United States Patent Specification No. 2,509,859 describes the reaction of butadiene and hydrogen cyanide in the presence of a halide of a metal of Group IB of the Periodic System, for example cuprous chloride, to give 3-pentene nitrile. Although the reaction is described as catalytic good yields of 3-pentene nitrile are obtained only if substantially equimolar proportions of butadiene and Group IB metal halide are used. With catalytic proportions, for example 0.006 moles of cuprous chloride per mole of butadiene, both the conversion of butadiene and the yield of 3-pentene nitrile are low.

We have now found that good yields of product are obtained using only catalytic amounts of Group IB metal salt if the said salt is used in the form of its complex with an organic nitrile.

Accordingly our invention provides a process for the manufacture of organic nitriles which comprises reacting an olefin with hydrogen cyanide in the presence of a catalytic amount of a complex of a Group IB metal salt and an organic nitrile.

The Groups of elements referred to herein are those of the "Long Form" of the Periodic Table of Mendeleev referred to at pages 23 to 24 and illustrated on the end plate of "Advanced Inorganic Chemistry," 2nd edition, by F. A. Cotton and G. Wilkinson (Interscience Publishers, New York, 1966). The Group IB metals from which the salts used in our process are derived are copper, silver and gold. The salts may be inorganic acid salts, for example the sulphates or phosphates, but especially the halides. Important halides are the chlorides, bromides and iodides, for example cuprous chloride, cuprous bromide, cuprous iodide, silver iodide and gold chloride. The cuprous halides are particularly important. Alternatively organic acid salts may be used, for example the salts of aliphatic acids, for example the acetates or lactates.

The organic nitrile which forms the complex with the Group IB metal salt may contain one or more nitrile groups. Preferably the organic residue to which the nitrile groups are attached contains up to three carbon atoms. Such organic residues may be saturated or may contain ethylenic unsaturation. Although organic nitriles having the nitrile groups attached to organic residues having more than three carbon atoms give complexes with the Group IB metal salt which are more effective than the said salt itself in the reaction of an olefin with hydrogen cyanide, they are generally not as effective as those complexes obtained from organic nitriles containing up to three carbon atoms in the organic residue. Particularly suitable organic nitriles for forming complexes with the Group IB metal salt are acetonitrile, propionitrile, acrylonitrile and tetracyanoethylene.

The complexes of the organic nitrile with the Group IB metal salt are formed by mixing the components, optionally in the presence of a solvent. It is important that the Group IB metal salt is mixed with the organic nitrile before or at the same time as it is mixed with the olefin and the hydrogen cyanide. Both the olefin and the hydrogen cyanide will form a complex with the Group IB metal and if this occurs before the introduction of the organic nitrile formation of the desired complex with the latter may be precluded. Thus, although organic nitriles are formed in the process of this invention, such nitriles, when formed after the initiation of the reaction, are not generally effective in promoting the catalytic effect of the Group IB metal salt. For example, if 3-pentenenitrile is added to a Group IB metal salt before or at the same time as the latter is added to butadiene and hydrogen cyanide to make 3-pentenenitrile an improved catalytic effect is obtained, but not otherwise.

The organic nitrile used to form the complex with the Group IB metal salt may be used in approximately stoichiometric amount bearing in mind that each nitrile group of a compound containing more than one such group is capable of forming a complex with copper. Substantially more than the stoichiometric amount may be used, however, especially where the organic nitrile is capable of acting as a solvent.

The process of our invention may be carried out over a wide range of temperatures, for example from —25° C. to 200° C., preferably from 20° to 150° C., and more preferably from 50° to 120° C. Owing to the volatility and toxicity of hydrogen cyanide the reaction is preferably conducted in a closed vessel under autogenous pressure, or, if desired, under deliberately raised pressure, for example at a pressure of from 1 to 50 atmopheres. If desired a solvent may be used, for example a hydrocarbon solvent such as benzene, toluene or xylene, or a nitrile solvent such as acetonitrile, benzonitrile or adiponitrile. Agitation of the reactants is desirable. The reaction is continued for a time sufficient to give a suitable conversion. In the case of a batch process the time will normally be for from a few minutes, for example 5 minutes, up to a period of several days, for example 5 days. In the case of a continuously operated process in which the reactants are passed over a supported catalyst the time of contact may be as low as a few seconds, for example 3 seconds, but may of course be longer.

The olefin and the hydrogen cyanide may be used in equimolar proportions or an excess of either may be used, especially within the molar range of olefin to hydrogen cyanide of 2:1 to 1:4. The complex of the Group IB metal salt and the organic nitrile is used in catalytic amount: this will normally fall within the range 0.0005 to 0.1 moles of each per mole of olefin. We prefer that the proportion of the said complex is from 0.005 to 0.05 moles per mole of olefin.

The organic nitrile formed in the process may be separated from the reaction mixture by first removing any excess olefin and/or hydrogen cyanide by distillation or by simply venting the apparatus. The organic nitrile may then be separated from catalyst residues by conventional methods such as filtration with or without extraction with solvent, or by distillation. The process may readily be adapted to continuous operation.

The process of our invention is particularly valuable for the conversion of butadiene to 3-pentene nitrile. Compared with the process of United States Patent Specification No. 2,509,859 the process of our invention enables the conversion to be effected in good yield using only a catalytic amount of Group IB metal salt (in the form of its complex with an organic nitrile) instead of the equimolar amount required by the prior process.

3-Pentene nitrile is particularly valuable for further reaction with hydrogen cyanide in the presence of a catalyst to give adiponitrile. Adiponitrile may be hydrogenated to hexamethylene diamine, a valuable intermediate for polycondensation with dicarboxylic acids to give polyamides, especially, for example, with adipic acid to give polyhexamethylene adipamide (nylon 6,6) a well-known polyamide for use in the manufacture of mouldings and for melt spinning into synthetic fibres.

It has already been proposed to react butadiene and hydrogen cyanide in the presence of catalytic amounts of certain catalysts, for example certain zero valent nickel catalysts, as described, for example, in United Kingdom Patent Specification No. 1,104,140. Such processes give mixtures of linear pentene nitriles, which are convertible by further reaction with hydrogen cyanide into adiponitrile, and branched methylbutene nitriles which cannot be converted directly to adiponitrile. The proportion of linear pentene nitriles compared with branched methylbutene nitriles produced in such processes is not normally in excess of 70% by weight (or molar). It is an advantage of the process of our invention that the proportion of linear 3-pentene nitrile, directly convertible to adiponitrile, which is produced is appreciably higher, usually at least 80% by weight (or molar). Moreover, the zero valent nickel catalysts used in the prior process are sensitive to moisture, whereas the catalysts used in our process are not. Thus anhydrous conditions are not required, and it is not, therefore, necessary, for example, to specially dry the olefin and hydrogen cyanide.

The invention is illustrated but not limited by the following Examples in which the parts and percentages are by weight.

EXAMPLE 1

A mixture of 1.5 parts (0.015 moles) of anhydrous cuprous chloride, 0.15 parts (0.0012 moles) of tetracyanoethylene and 3.9 parts of acetonitrile were cooled to −20° C. and 26 parts (0.4815 moles) of butadiene and 10.3 parts (0.3815 moles) of hydrogen cyanide were added. The resulting mixture was then heated with agitation at 100° C. in a closed vessel for 60 hours. After cooling to the ordinary temperature the vessel was vented to remove butadiene and hydrogen cyanide. The residue (35 parts) was found by gas-liquid chromatographic analysis to contain 78% of 3-pentene nitrile and 4% of 2-methylbutene nitrile corresponding with a yield of 3-pentene nitrile of 88.3% calculated on hydrogen cyanide. A portion of the crude product (22.8 parts) after twice distilling gave 12 parts of 3-pentene nitrile, b.p. 144° C.

EXAMPLE 2

A mixture of 0.5 parts (0.0051 moles) of cuprous chloride, 0.1 parts (0.00078 moles) of tetracyano-ethylene and 1.6 parts of benzene were cooled to −20° C. and 5.5 parts (0.1019 moles) of butadiene and 5.5 parts (0.2037 moles) of hydrogen cyanide were added. The resulting mixture was then heated with agitation at 100° C. in a closed vessel for 8 hours. After cooling to the ordinary temperature the vessel was vented to remove butadiene and hydrogen cyanide. The residue (4.7 parts) was found to contain 76% of 3-pentenenitrile and 3.4% of 2-methylbutenenitrile.

EXAMPLE 3

A mixture of 0.5 parts (0.0051 moles) of cuprous chloride and 1.0 parts (0.0244 moles) of acetonitrile was cooled to −20° C. and 5.52 parts (0.1022 moles) of butadiene and 2.07 parts (0.077 moles) of hydrogen cyanide were added. The resulting mixture was heated with agitation at 100° C. in a closed vessel for 8 hours. After cooling to the ordinary temperature the vessel was vented to remove butadiene and hydrogen cyanide. The residue (3.6 parts) was found by gas-liquid chromatographic analysis to contain 75% of 3-pentene nitrile and 3.5% of 2-methylbutenenitrile corresponding with a yield of 3-pentenenitrile of 36.3% calculated on hydrogen cyanide.

EXAMPLE 4

A mixture of 0.5 parts (0.0051 moles) of cuprous chloride and 0.5 parts (0.00943 moles) of acrylonitrile was cooled to −20° C. and 5.52 parts (0.1022 moles) of butadiene and 2.07 parts (0.077 moles) of hydrogen cyanide were added. The resulting mixture was heated with agitation at 100° C. in a closed vessel for 8 hours. After cooling to the ordinary temperature the vessel was vented to remove butadiene and hydrogen cyanide. The residue (3.1 parts) was found by gas-liquid chromatographic analysis to contain 73% 3-pentenenitrile and 4.2% of 2-methylbutenenitrile corresponding with a yield of 3-pentenenitrile of 36.3% calculated on hydrogen cyanide.

EXAMPLE 5

A mixture of 0.5 parts (0.0051 moles) of cuprous chloride and 0.5 (0.00617 moles) parts of 3-pentenenitrile was cooled to −20° C. and 5.52 parts (0.01022 moles) of butadiene and 2.07 parts (0.077 moles) of hydrogen cyanide were added. The resulting mixture was heated with agitation of 100° C. in a closed vessel for 8 hours. After cooling to the ordinary temperature the vessel was vented to remove butadiene and hydrogen cyanide. The residue 1.5 parts was found by gas liquid chromatographic analysis to contain 81% 3-pentenenitrile, and 4% of 2-methylbutenenitrile corresponding with a yield of 3-pentenenitrile of 11.5% calculated on hydrogen cyanide.

EXAMPLE 6

Comparative Example

A mixture of 0.5 parts (0.0051 moles) of cuprous chloride and 2.07 parts (0.077 moles) of hydrogen cyanide and 5.52 parts (0.1022 moles) of butadiene was heated with agitation at 100° C. in a closed vessel for 8 hours. After cooling to the ordinary temperature the vessel was vented to remove butadiene and hydrogen cyanide. The residue 0.3 parts was found by gas liquid chromatographic analysis to contain 73% 3-pentenenitrile and 4.1% 2-methylbutenenitrile corresponding with a yield of 3-pentenenitrile of 3.5% calculated on hydrogen cyanide.

EXAMPLE 7

Comparative Example

A mixture of nickel tetrakis-tri-para-tolyl phosphite (0.6 parts) in benzene (3 parts) was cooled to −20° C. and 15 parts of butadiene and 6 parts hydrogencyanide were added. The resulting mixture was heated with agitation at 100° C. in a closed vessel for 8 hours. After cooling to the ordinary temperature the vessel was vented to remove butadiene and hydrogencyanide. The residue 8.1 parts was found by gas liquid chromatographic analysis to contain 3-pentenenitrile and 2-methylbutenenitrile in the molar ratio of 2:1.

I claim:

1. A process for the manufacture of 3-pentenenitrile which comprises reacting at a temperature within the range −25° C. to 200° C. a mixture of butadiene, hydrogen cyanide and, as sole catalyst, a complex of cuprous chloride, bromide or iodide with an organic nitrile selected from 3-pentenenitrile and compounds having nitrile groups attached to a saturated or ethylenically unsaturated hydrocarbon residue containing up to three carbon atoms, the said catalyst being used in the amount of 0.0005 to 0.1 mole per mole of butadiene, the molar ratio of butadiene to hydrogen cyanide being 2:1 to 1:4, and the catalyst complex being formed by mixing the said cuprous salt with the said organic nitrile before or at the same time as it is mixed with the butadiene and hydrogen cyanide.

2. The process of Claim 1 carried out in the presence of a hydrocarbon solvent.

3. The process of Claim 1 carried out in the presence of a nitrile solvent.

4. The process of Claim 1 in which the organic nitrile used to form the complex with the said cuprous salt is used in stoichiometric amount.

5. The process of Claim 1 in which the organic nitrile which forms the complex with the said cuprous salt is acetonitrile, propionitrile, acrylonitrile, tetracyanoethylene or 3-pentenenitrile.

6. A process according to Claim 1 for the manufacture of 3-pentenenitrile which comprises reacting butadiene and hydrogen cyanide in the molar ratio of 2:1 to 1:4 at a temperature of 20 to 150° C. in the presence as catalyst of 0.0005 to 0.1 moles per mole of butadiene of a complex of cuprous chloride with at least a stoichiometric amount of acetonitrile, propionitrile, acrylonitrile, tetracyanoethylene or 3-pentenenitrile, and separating 3-pentenenitrile from the product mixture.

References Cited
UNITED STATES PATENTS

| | | | |
|---|---|---|---|
| 3,711,527 | 1/1973 | Kurtz | 260—465.8 R |
| 3,558,688 | 1/1971 | Drinkard, Jr. | 260—465.9 |
| 3,547,972 | 12/1970 | Dirnkard, Jr. | 260—465.3 |
| 2,464,723 | 3/1949 | Schulze et al. | 260—465.3 |
| 2,509,859 | 5/1950 | Coffman et al. | 260—465.3 |

JOSEPH P. BRUST, Primary Examiner